United States Patent
Veenman

(10) Patent No.: US 12,319,494 B2
(45) Date of Patent: Jun. 3, 2025

(54) CONTAINER STRUCTURE AND ASSOCIATED ASSEMBLY, METHOD AND ADJUSTMENT MECHANISM

(71) Applicant: Swisslog BV, Culemborg (NL)

(72) Inventor: Michiel Veenman, Wijchen (NL)

(73) Assignee: Swisslog BV, Culemborg (NL)

( * ) Notice: Subject to any disclaimer, the term of this patent is extended or adjusted under 35 U.S.C. 154(b) by 1138 days.

(21) Appl. No.: 17/254,349

(22) PCT Filed: Jun. 21, 2018

(86) PCT No.: PCT/EP2018/066681
§ 371 (c)(1),
(2) Date: Dec. 21, 2020

(87) PCT Pub. No.: WO2019/242864
PCT Pub. Date: Dec. 26, 2019

(65) Prior Publication Data
US 2021/0253339 A1    Aug. 19, 2021

(51) Int. Cl.
| B65D 88/54 | (2006.01) |
| B07B 13/16 | (2006.01) |
| B65D 90/00 | (2006.01) |
| B65G 1/04 | (2006.01) |

(52) U.S. Cl.
CPC ............ B65D 88/546 (2013.01); B07B 13/16 (2013.01); B65D 88/54 (2013.01); B65D 90/008 (2013.01); *B65G 1/0407* (2013.01); *B65G 2207/30* (2013.01)

(58) Field of Classification Search
CPC . B65D 88/546; B65D 90/008; B65G 2207/30
USPC ........................................................ 700/218
See application file for complete search history.

(56) References Cited

U.S. PATENT DOCUMENTS

| 3,559,822 | A |  | 2/1971 | Lichtenford et al. |
| 6,505,755 | B1 | * | 1/2003 | Voss ........................ G07D 11/10 221/84 |
| 2005/0220600 | A1 |  | 10/2005 | Baker et al. |
| 2008/0152468 | A1 |  | 6/2008 | de Milly |
| 2018/0265295 | A1 | * | 9/2018 | Beckman .................. B61D 3/16 |
| 2019/0380284 | A1 | * | 12/2019 | Kee .......................... A01G 9/246 |

FOREIGN PATENT DOCUMENTS

| DE | 4009635 A1 | 10/1991 |
| DE | 202016004708 U1 | 11/2016 |
| FR | 2650574 A1 | 2/1991 |

(Continued)

OTHER PUBLICATIONS

European Patent Office; Examination in related European Patent Application No. 18 735 529.2 dated Apr. 26, 2023; 8 pages.

(Continued)

*Primary Examiner* — Jacob S. Scott
*Assistant Examiner* — Michael E Butler
(74) *Attorney, Agent, or Firm* — Dorton & Willis, LLP

(57) ABSTRACT

A container structure, for example a container structure having a footprint and/or overall dimensions substantially corresponding to those of an intermodal freight shipping container, includes conveying means integrated or mounted into or onto the container structure for conveying items within a footprint or a convex hull of the container structure.

21 Claims, 8 Drawing Sheets

(56) References Cited

FOREIGN PATENT DOCUMENTS

| GB | 2143223 A | 2/1985 |
|---|---|---|
| WO | 2014080389 A2 | 5/2014 |
| WO | 2014080390 A2 | 5/2014 |
| WO | 2015073981 A1 | 5/2015 |
| WO | 2015112035 A1 | 7/2015 |
| WO | 2016166306 A1 | 10/2016 |
| WO | 017081550 A1 | 5/2017 |
| WO | 2018085891 A1 | 5/2018 |

OTHER PUBLICATIONS

European Patent Office; Search Report and Written Opinion in related International Patent Application No. PCT/EP2018/066681 dated May 6, 2019; 23 pages.

\* cited by examiner

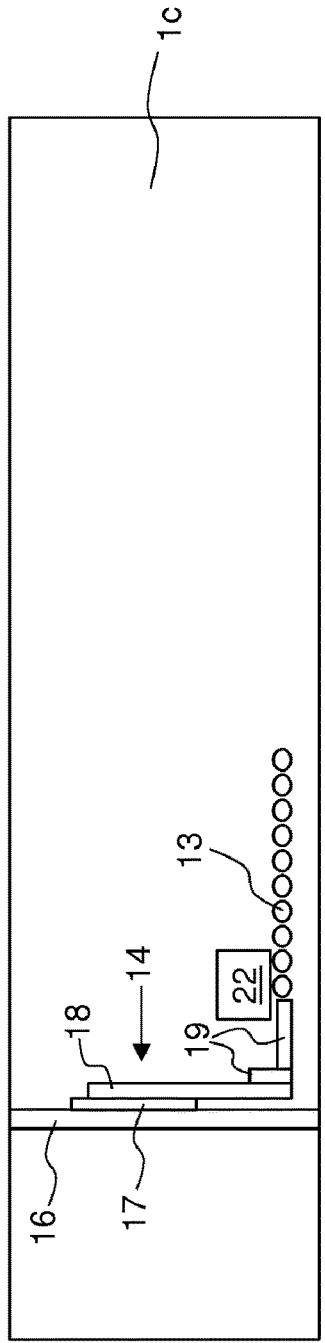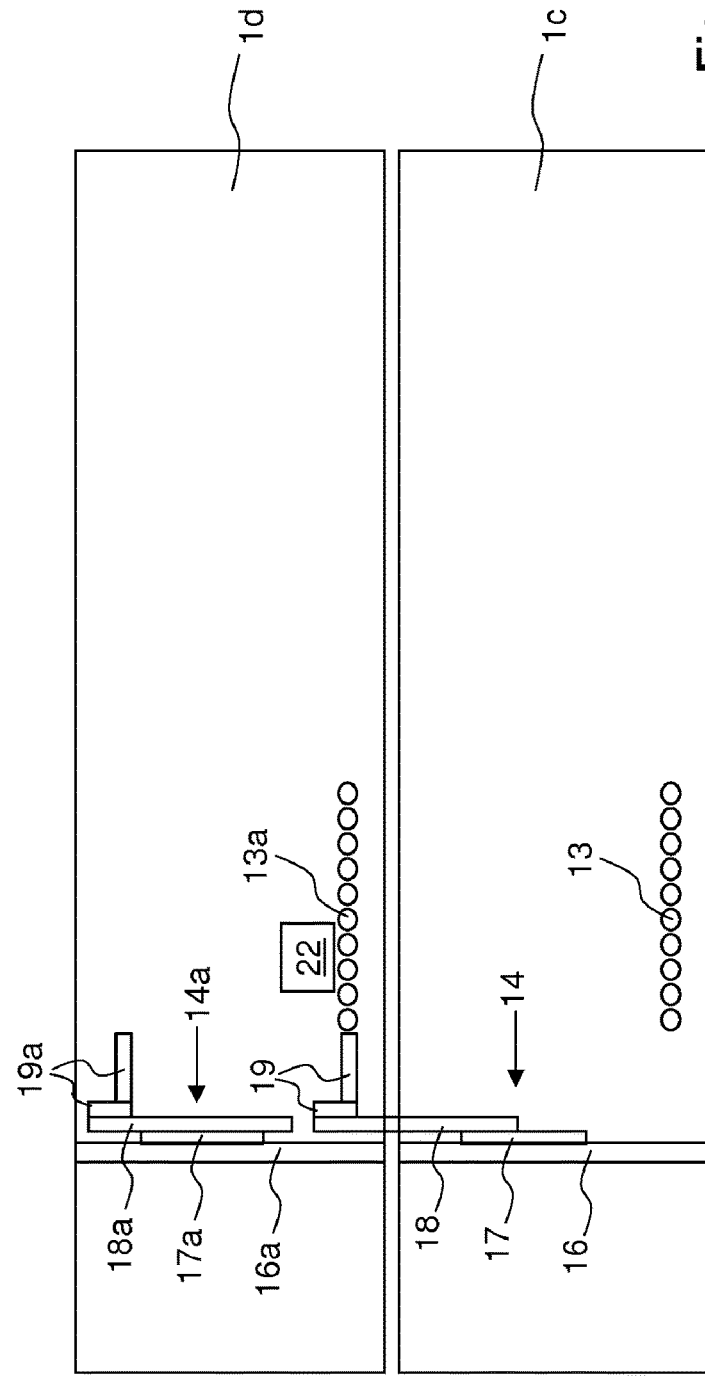

CONTAINER STRUCTURE AND ASSOCIATED ASSEMBLY, METHOD AND ADJUSTMENT MECHANISM

CROSS-REFERENCE TO RELATED APPLICATIONS

This application is a national phase application under 35 U.S.C. § 371 of International Patent Application No. PCT/EP2018/066681, filed Jun. 21, 2018 (pending), the disclosure of which is incorporated by reference herein in its entirety.

TECHNICAL FIELD

The present invention relates to a container structure and an associated assembly, method and adjustment mechanism.

BACKGROUND

The invention finds particular application in the context of shipping containers, in particular intermodal freight shipping containers (or simply intermodal freight containers). The technical advantages of at least some aspects of the invention are particularly pronounced in the context of an intermodal freight container (or a container structure having a footprint and/or overall dimensions substantially corresponding to those of an intermodal freight container) given the high standardization, i.e. in particular the fact that their dimensions agree with those of many vehicles such as lorries/trucks, railroad or railway rolling stock (flatcars/flat wagons or well cars/well wagons) or ships. However, at least some aspects of the invention are also applicable to other types of shipping containers or container structures. Nevertheless, aspects and embodiments of the invention will primarily be described with reference to container structures having a footprint and/or overall dimensions substantially corresponding to those of an intermodal freight container.

Intermodal freight containers are typically either 40 ft containers or 20 ft containers. 40 ft containers have a length of 40 ft (12.2 m). 20 ft containers have a length of slightly less than half the length of a 40 ft container, i.e. 19' 10.5" (6.1 m). Other sizes are also in use, such as 45 ft (13.7 m), 48 ft (14.6 m), 53 ft (16.2 m) and 60 ft (18.3 m).

Intermodal freight containers have been used for many years to transport goods over large distances. A typical intermodal freight container is of generally cuboid shape with a double door at one end of the container for loading goods into the container and unloading goods from the container. Typically, in order to load goods into the container, the goods would be placed on a pallet, which is lifted by a forklift truck or similar. The forklift truck would then be driven into the lorry (for example at a loading bay of a warehouse) and the pallet would be positioned by the forklift truck within the container. The unloading process would typically follow the same pattern, in reverse.

The inventor has appreciated that the above described traditional way of using containers can be relatively labor-intensive and inflexible. The inventor has appreciated, for example, that goods stored within the container at a location furthest away from the door cannot normally be accessed unless all other goods are unloaded first.

The inventor has also appreciated that the typical way of using intermodal containers requires relatively large warehouses, at which the containers can be loaded and unloaded. In this context, the inventor has further appreciated that such warehouses cannot easily be modified in terms of size or layout so that the inventor considers them somewhat inflexible.

SUMMARY

It is an object of certain aspects of the invention to provide a container structure and an associated assembly, method and adjustment mechanism, which provide an alternative, and potentially more flexible approach.

The following example embodiments identify various aspects of a container structure and related systems and methods in accordance with the principles of the present disclosure.

Example Embodiment 1. A container structure, preferably a container structure having a footprint and/or overall dimensions substantially corresponding to those of an intermodal freight shipping container, comprising
conveying means integrated or mounted into or onto the container structure for conveying items within a footprint or a convex hull of the container structure.

Example Embodiment 2. The container structure of Example Embodiment 1, wherein the conveying means comprises a conveyor belt and/or a robotic arm and/or a lift.

Example Embodiment 3. The container structure of Example Embodiments 1 or 2, wherein the conveying means is arranged to convey items beyond the footprint or convex hull of the container structure.

Example Embodiment 4. The container structure of Example Embodiment 3, wherein the conveying means is arranged to extend beyond the footprint or convex hull of the container structure.

Example Embodiment 5. The container structure of Example Embodiment 4, wherein the conveying means comprises a conveyor belt, wherein at least a portion of the conveyor belt is arranged to move from a position within the footprint or convex hull of the container structure to a position outside the footprint or convex hull of the container structure.

Example Embodiment 6. The container structure of Example Embodiment 5, wherein the conveyor belt is arranged to move as a whole so that said portion of the conveyor belt moves from the position within the footprint or convex hull of the container structure to the position outside the footprint or convex hull of the container structure.

Example Embodiment 7. The container structure of Example Embodiment 5 or 6, wherein the conveyor belt is arranged to perform a sliding or pivoting movement so that said portion of the conveyor belt moves from the position within the footprint or convex hull of the container structure to the position outside the footprint or convex hull of the container structure.

Example Embodiment 8. The container structure of Example Embodiment 4, wherein the conveying means comprises a robotic arm, which is arranged to reach beyond the footprint or convex hull of the container structure.

Example Embodiment 9. The container structure of Example Embodiment 3 or 4, wherein the conveying means comprises a lift, and wherein the lift preferably comprises a telescopic lift, a scissor lift or a rack lift.

Example Embodiment 10. The container structure of Example Embodiment 3, wherein the conveying means is arranged to remain within the footprint or convex hull of the container structure but is arranged to convey items to a position where they project into a space outside the footprint or convex hull of the container structure.

Example Embodiment 11. The container structure of any one of Example Embodiments 3 to 10, further comprising an opening, preferably a door, preferably a sliding door, in a first one of the six main faces of the container structure.

Example Embodiment 12. The container structure of Example Embodiment 11, further comprising at least one further opening, preferably a further door, preferably a sliding door, in the first main face and/or in one or more of the other five main faces of the container structure.

Example Embodiment 13. The container structure of Example Embodiment 11 or 12, wherein the conveying means is arranged to convey items towards and/or through the opening/door and/or the further opening/door.

Example Embodiment 14. An assembly comprising:
the container structure of any one of Example Embodiments 3 to 13; and
a further container structure,
wherein said container structure and said further container structure are located sufficiently close to each other so that the conveying means is able to convey items from said container structure to said further container structure.

Example Embodiment 15. The assembly of Example Embodiment 14, wherein the further container structure also comprises a said conveying means.

Example Embodiment 16. The assembly of Example Embodiment 14 or 15, wherein the conveying means of said container structure and/or the conveying means of said further container structure is arranged to extend respectively into the footprint or convex hull of said further container structure and/or said container structure.

Example Embodiment 17. The assembly of any one of Example Embodiments 14 to 16, wherein said container structure and said further container structure are arranged one of:
side by side
end to side
end to end
one on top of the other.

Example Embodiment 18. The assembly of any one of Example Embodiments 14 to 17, wherein the assembly comprises three or more such container structures.

Example Embodiment 19. The assembly of any one of Example Embodiments 14 to 18, wherein said container structure is located on a first means of transport and said further container structure is located on a second means of transport which is movable substantially independently from the first means of transport.

Example Embodiment 20. The assembly of any one of Example Embodiments 14 to 18, wherein each of at least two of the container structures of the assembly has at least one storage location for storing a plurality of items, wherein the assembly is arranged to convey items from the at least one storage location of one of the container structures to at least one storage location of at least one other container structure so as to reduce the number of items, preferably remove all items, stored in the at least one storage location of said one container structure.

Example Embodiment 21. The assembly of Example Embodiment 20, wherein the assembly is arranged to convey items from said one of the container structures to said at least one storage location of said at least one other container structure so as to reduce the number of items, preferably remove all items, stored in said one container structure.

Example Embodiment 22. The assembly of Example Embodiment 20, wherein the assembly is arranged to convey items of a first type from said one of the container structures to said at least one storage location of said at least one other container structure so as to reduce the number of items of the first type, preferably remove all items of the first type, stored in said one container structure, and preferably wherein the assembly is arranged to convey items of a second type from said at least one other container structures to said one container structure.

Example Embodiment 23. A method of conveying items within a container structure, the container structure preferably having a footprint and/or overall dimensions substantially corresponding to those of an intermodal freight shipping container, the method comprising:
using conveying means integrated or mounted into or onto the container structure for conveying items within a footprint or a convex hull of the container structure.

Example Embodiment 24. The method of Example Embodiment 23, further comprising:
using the conveying means to convey items beyond the footprint or convex hull of the container structure.

Example Embodiment 25. A method of operating the assembly of Example Embodiment 20, the method comprising conveying items from the at least one storage location of one of the container structures to at least one storage location of at least one other container structure so as to reduce the number of items, preferably remove all items, stored in the at least one storage location of said one container structure.

Example Embodiment 26. The method of Example Embodiment 25, further comprising conveying items from said one of the container structures to said at least one storage location of said at least one other container structure so as to reduce the number of items, preferably remove all items, stored in said one container structure.

Example Embodiment 27. The method of Example Embodiment 25, further comprising conveying items of a first type from said one of the container structures to said at least one storage location of said at least one other container structure so as to reduce the number of items of the first type, preferably remove all items of the first type, stored in said one container structure, and preferably
wherein the assembly is arranged to convey items of a second type from said at least one other container structures to said one container structure.

Example Embodiment 28. The method of any one of Example Embodiments 25 to 27, further comprising removing said one of the container structures from the assembly and/or adding a further container structure to the assembly.

Example Embodiment 29. A method of handling first and second container structures, preferably container structures having a footprint and/or overall dimensions substantially corresponding to those of an intermodal freight shipping container, the method comprising:
while the first container structure is located on a first means of transport and the second container structure is located on a second means of transport which is movable substantially independently from the first means of transport, placing the first and second means of transport sufficiently close to each other so that the first and second container structures are located sufficiently close to each other so that items can be conveyed from the first container structure to the second container structure and/or from the second container structure to the first container structure using conveying means integrated or mounted into or onto the first container structure and/or the second container structure.

Example Embodiment 30. A container structure of generally cuboid form, comprising
  a first door in a first one of the six main faces of the container structure; and
  a first seal at least partially surrounding the first door,
  wherein, when said first main face is pushed or pressed against a flat surface, the first seal contacts the flat surface.

Example Embodiment 31. The container structure of Example Embodiment 30, wherein the first seal surrounds the first door on at least three sides, preferably at the top and two sides of the first door, more preferably on four sides of the first door.

Example Embodiment 32. The container structure of Example Embodiment 30 or 31, wherein the first seal is expandable and/or inflatable and/or retractable.

Example Embodiment 33. The container structure of Example Embodiment 32, wherein, when said first main face is pushed or pressed against said flat surface, the first seal only contacts the flat surface when the seal has been expanded and/or inflated but not when the seal has been retracted or deflated.

Example Embodiment 34. The container structure of any one of Example Embodiments 30 to 33, wherein the first door comprises a sliding door.

Example Embodiment 35. The container structure of any one of Example Embodiments 30 to 34, further comprising at least one further door in the first main face and/or in one or more of the other five main faces of the container structure.

Example Embodiment 36. The container structure of Example Embodiment 35, further comprising a further seal at least partially surrounding the further door, wherein the further door and/or the further seal are preferably of the same construction respectively as the first door and the first seal.

Example Embodiment 37. The container structure of any one of Example Embodiments 30 to 36, wherein the container structure has a footprint and/or overall dimensions substantially corresponding to those of an intermodal freight shipping container.

Example Embodiment 38. An adjustment mechanism for use with a container structure, comprising:
  a base portion;
  a movable portion connected to the base portion, wherein the movable portion is arranged to perform a translational movement with respect to the base portion, wherein, when the adjustment mechanism is in an upright orientation in which the movable portion is located above the base portion, the translational movement is a substantially horizontal movement; and
  moving means for causing the movable portion to perform said translational movement,
  wherein the movable portion is arranged to be connected to a bottom corner of an intermodal freight shipping container so as to support the intermodal freight shipping container and to enable the intermodal freight shipping container to be translated substantially horizontally.

Example Embodiment 39. The adjustment mechanism of Example Embodiment 38, wherein the moving means is motorized.

Example Embodiment 40. The adjustment mechanism of Example Embodiment 38 or 39, wherein the base portion is arranged to be connected to a top corner of a further intermodal freight shipping container so that the adjustment mechanism is supported by the further intermodal freight shipping container.

Example Embodiment 41. An assembly comprising: a container structure, the container structure preferably having a footprint and/or overall dimensions substantially corresponding to those of an intermodal freight shipping container, and
  at least one adjustment mechanism of any one of Example Embodiments 38 to 40.

Example Embodiment 42. The assembly of Example Embodiment 40, wherein the assembly comprises four such adjustment mechanisms, one such adjustment mechanism being connected to each of four bottom corners of the container structure.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

FIG. 7a shows a container structure according to an embodiment of the present invention.

FIG. 7b shows the container structure of FIG. 7a and a further container structure according to an embodiment of the present invention.

DETAILED DESCRIPTION

Figure 1:
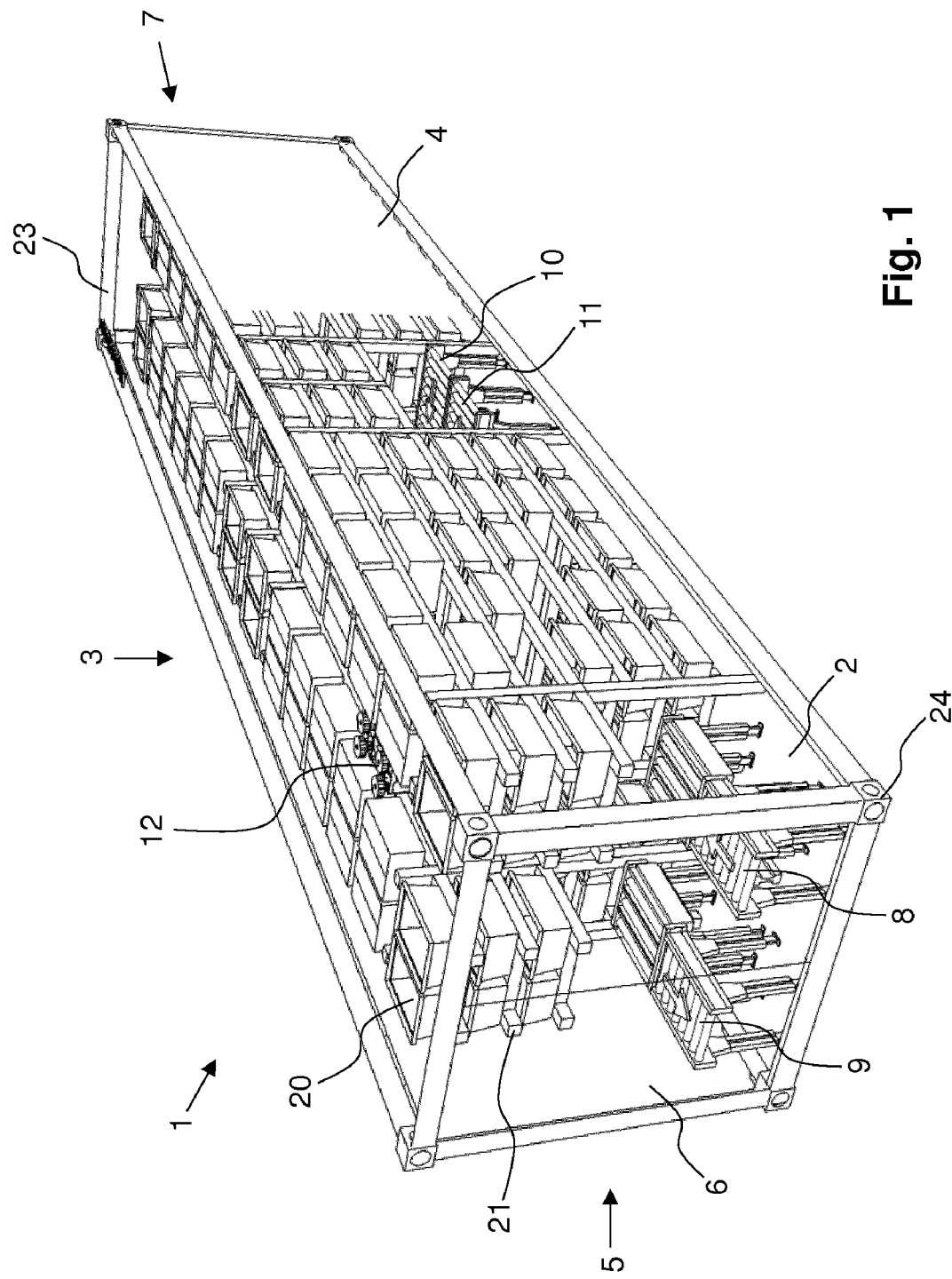
FIG. 1 shows a perspective view of a container structure according to an embodiment of the present invention.

FIG. 1 shows a perspective view of a container structure 1 according to an embodiment of the present disclosure. The container structure 1 is of generally cuboid shape having a bottom or floor 2, a top or ceiling 3, a side 4 and an opposite side 5, which is hidden in the view of FIG. 1. The container structure 1 further has an end face 6 and an opposite end face 7 (hidden). The container structure 1 may have overall dimensions corresponding to those of an intermodal freight container. Further, the eight corners 24 of the container structure 1 may be constructed in the same or a similar manner as the corners of intermodal freight containers so that the container structure 1 can be connected to, or stacked with, state-of-the-art intermodal freight containers. Likewise, the container structure 1 can be transported in the same way as a state-of-the-art intermodal freight container, e.g. on a lorry/truck, a ship or by rail. In particular, the corners 24 of the container structure 1 may be provided with connectors 24 corresponding to those on intermodal freight containers.

The reference numeral 24 is deliberately used both for the corners and the connectors, bearing in mind that the term 'corner' is primarily meant to refer to an area/volume near the 'corner', rather than to the actual corner in a geometrical/mathematical sense.

As with intermodal freight containers, the sides 4 and 5 of the container structure 1 would be much longer than the end faces 6 and 7. However, in variants of the embodiment shown in FIG. 1, the container structure 1 may have dimensions which are different from those of intermodal freight containers.

The bottom 2 of the container structure 1 would typically be a solid floor, on which the contents of the container structure 1 (to be described later) rest. The other main faces of the container structure 1 (sides 4, 5; and faces 6, 7; top 3) may or may not be of a solid construction. A solid construction may be preferred if the container structure 1 is to be used outside, and in that case any or all of the main faces of the container structure 1 may be made from corrugated metal. In a variant, any or all of the sides and/or top are not of a solid construction and instead the overall dimensions of the container structure 1 are defined by a framework 23, for example steel beams extending along the edges of each of the main faces. Such a construction might be preferred if the container structure 1 is to be used within a building, such as a warehouse, where weatherproofing may not be necessary. A canvas or similar could be provided during transport on the top 3 and/or sides 4, 5 and/or end faces 6, 7.

The container structure 1 would be provided with one or more conveying means/movers. In the example shown in FIG. 1, the container structure 1 is provided with a number of conveyor belts. Four conveyor belts are visible in FIG. 1, i.e. longitudinal conveyor belts 8 and 9 and transverse conveyor belts 10 and 11. Further conveyor belts may be provided (not shown) to ensure that conveyor belts extend substantially along the entire length of the container structure 1. The conveyor belts 8 to 11 can cooperate with each other such that items can pass from one conveyor belt to another, as is in principle known in the art. They may also cooperate with each other indirectly via a robotic installation 12 described below.

The ends of the conveyor belts 8 to 11 are located close to end face 6 and side 4 or, more generally, the end faces of the container structure 1.

It will be appreciated that, in the case of a container structure 1 which has a framework 23 along the edges of the main faces rather than solid walls and a solid top, the "end faces" will preferably be defined by the position of the six faces of the smallest cuboid which fully encloses the container structure 1. Alternatively, the main faces could be defined by the convex hull of the container structure 1.

A number of shelves/racks 21 are arranged within the container structure 1. In the embodiment shown, these racks 21 carry bins 20, which can for example be plastic crates for storing items. Embodiments of the present invention are not limited in terms of the number of bins 20 or racks 21, nor their shape or material. Indeed, items could be stored individually on the shelves 21, and indeed the items could be stored directly on the floor 2 of the container structure 1.

A further conveying means 12 is provided in the container structure 1, of which only part is shown in FIG. 1. The conveying means 12 may comprise a robotic installation 12, for example one that can move along one or more rails along the length of the container structure 1. The robotic installation 12 may be provided with a robotic arm and a gripper so that it can grip items stored in bins 20, or so that it can grip bins 20 and move an item or a bin 20 onto one of the conveyor belts 8 to 11. In this way, all storage locations (here the space within the bins 20 and/or the locations where the bins 20 are kept on the racks 21) are accessible so that items or bins 20 can be taken from the racks 21 and placed onto one of the conveyor belts 8 to 11.

In variants of the embodiment shown in FIG. 1, other transport means, or a smaller or greater number thereof, may be provided within the container structure 1. For example, the robotic installation 12 does not necessarily need to be provided with a gripper nor indeed with a typical robotic arm and could instead comprise a mover that simply pushes a bin 20 onto a movable platform. Similarly, the conveyor belts 8 to 11 may or may not extend substantially along the entire length of the container structure 1 and could be partly or fully replaced by a robotic installation capable of moving along the length of the container structure 1.

Further, the term 'conveyor belt', as used herein, may refer to a 'typical conveyor belt' construction with a loop belt, but would preferably also encompass a series of rollers or similar, preferably motorized, for conveying items.

For loading items into bins 20, placing items onto racks 21 or placing bins 20 onto racks 21, the above described unloading process can be carried out in reverse.

Figure 2:
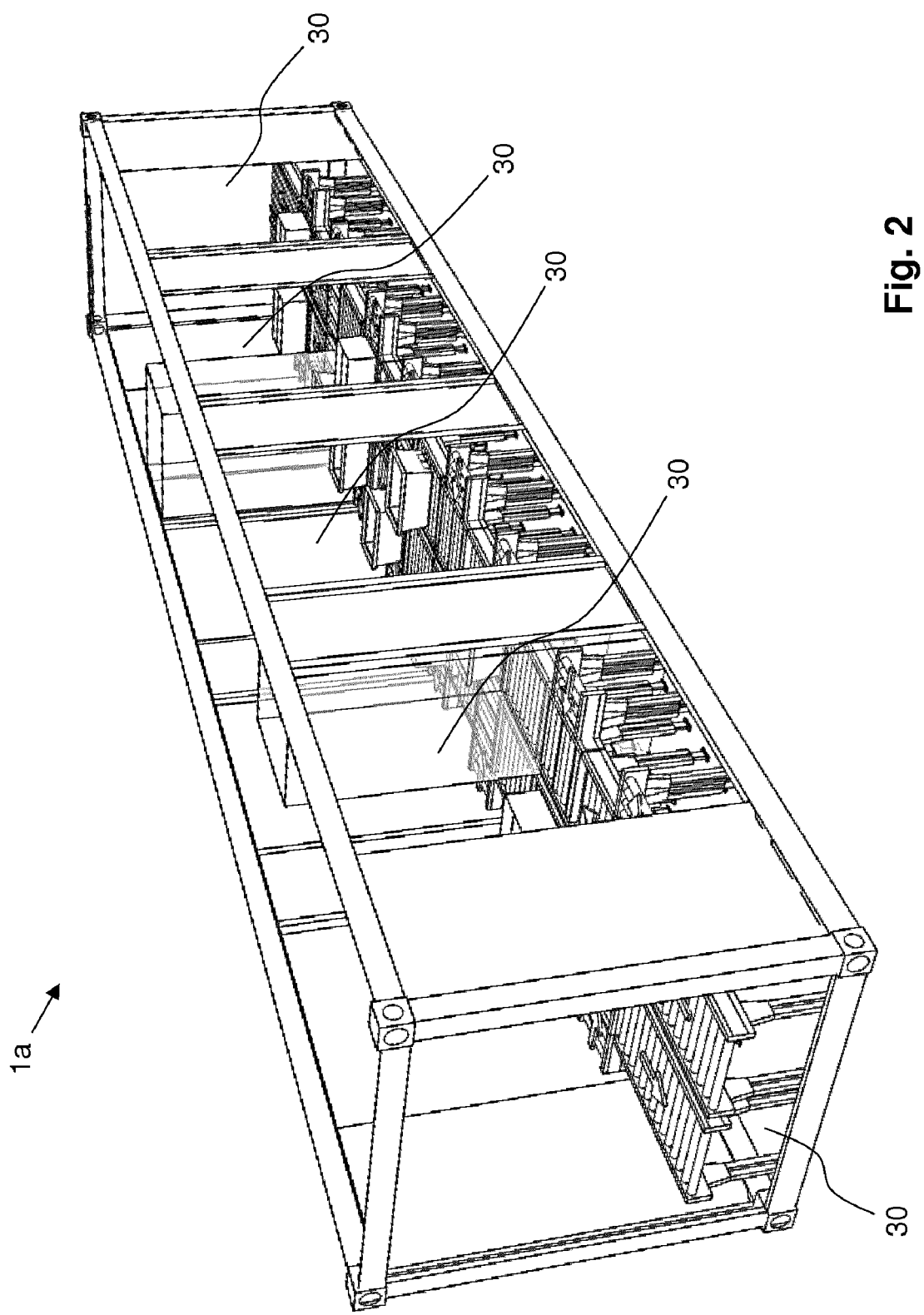
FIG. 2 shows a perspective view of a container structure according to another embodiment of the present invention.

FIG. 2 shows a further embodiment of a container structure 1. Externally, the container structure 1 according to this embodiment may be generally similar, in particular as regards its dimensions, to the container structure 1 of FIG. 1. However, the container structure 1a has little or no dedicated storage space, such as racks/shelves 21 for bins 20. Instead, the container structure 1a is equipped with a greater number of conveying means, in the example shown with conveyor belts. Four openings 30 are provided in each of the sides of container structure 1a. A set of two transversal conveyor belts is allocated to each opening 30. Additionally, longitudinal conveyor belts are provided towards the longitudinal ends (adjacent end faces 6 and 7) and between the transversal conveyor belts, as necessary. Through the provision of the transversal and longitudinal conveyor belts, items or bins 20 can be conveyed from any of the openings 30 to any other of the openings 30.

In a variant to the embodiment shown in FIG. 2, the conveyor belts (or some of the conveyor belts) could again be replaced by other conveying means, such as a robotic structure movable along one or more rails extending along the length of the container structure 1a. In any event, as with the embodiment shown in FIG. 1, the conveying means are integrated or mounted into or onto the container structure 1 or 1a. In other words, the conveying means are intended to remain permanently in or on the container structure 1 or 1a, in contrast to some approaches according to the state of the art, where a forklift truck or similar is used to convey items within, into or out of a container. The conveying means may, for example, be bolted to the floor or other part of the container structure, and whilst they would be intended to remain permanently in or on the container structure, the use of bolts would enable them to be removed, e.g. for servicing, repair or replacement. The conveying means could also be welded or riveted to any part of the container structure.

Figure 3:
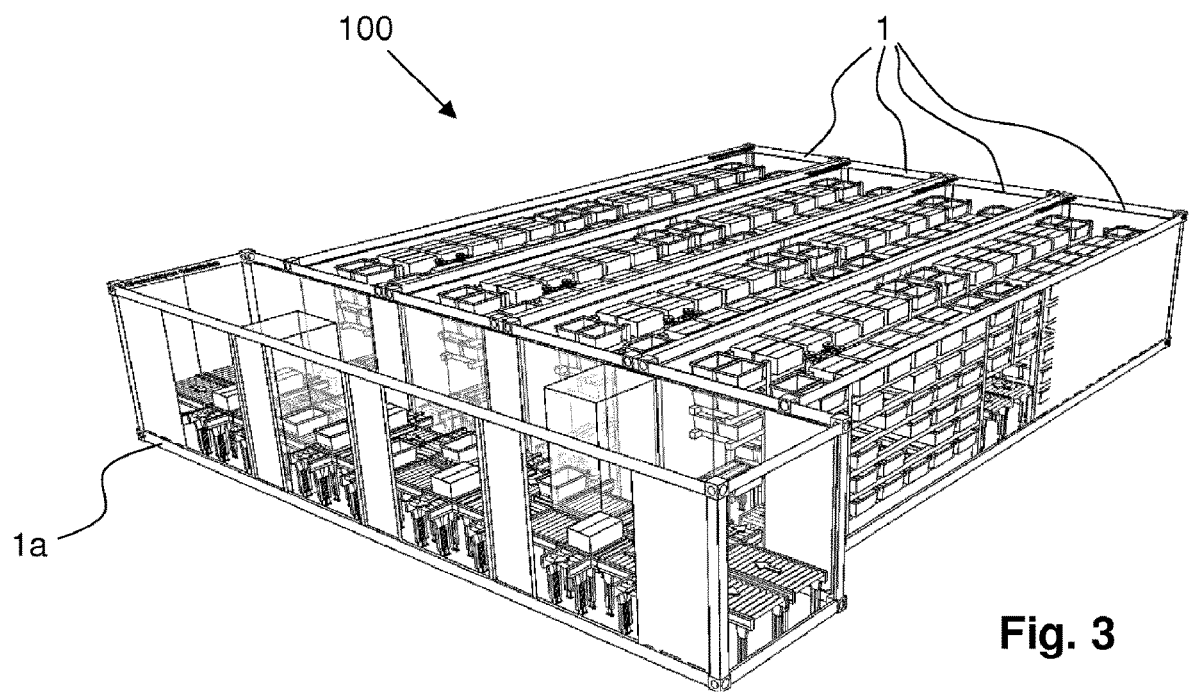
FIG. 3 shows an assembly of five container structures according to an embodiment of the present invention.

FIG. 3 shows an assembly 100 made up of one container structure 1a (FIG. 2) and four container structures 1 (FIG. 1). The container structures 1 are placed side by side, so that one of their end faces 6 is adjacent one of the openings 30 of the container structure 1a. A further four container structures 1 could be arranged at the opposite side of the container structure 1a. Further container structures could also be arranged at the end faces 6 and/or 7 of container structure 1*a*, as well as at the end face 7 of the container structures 1 facing away from the container structure 1*a*.

In principle, the modular character of the container structures 1 and 1*a* according to the present invention allow a large (almost unlimited) number of container structures to be assembled into assemblies 100 of a variety of shapes and sizes. The lateral openings in the middle of the sides 4 and 5 of container structure 1 allow further connections to be made, either among the container structures 1 shown in FIG. 3, or with further container structures.

Returning to FIGS. 1 and 2, the conveying means, in particular the conveyor belts 8 to 11 shown in FIG. 1 and the transversal and longitudinal conveyor belts shown in FIG. 2, can be arranged such that their ends do not project beyond the main faces or convex hull of the container structures 1 and 1*a*. However, their ends are close to the openings 30 so that, when two container structures are placed sufficiently close to each other (as shown in FIG. 3), items or bins 20 can be conveyed from one container structure to an adjacent container structure by the conveyor belts. As the items or bins 20 approach the end of one conveyor belt, they would eventually project beyond the convex hull of the container structure (while their center of gravity would still be supported by the conveyor belt of the container structure from which they are being conveyed). Eventually, the items or bins 20 would be picked up by the conveyor belt of the adjacent container structure so that a handover of items or bins 20 from one container structure to an adjacent container structure is possible.

Whilst there is in principle no limit on the number of conveyor belts per opening 30 (as long as at least one conveyor belt or other conveying means is provided), the inventor has found that two conveyor belts per opening are advantageous, not least in terms of costs and operational efficiency. The embodiment shown in FIG. 1 has one conveyor belt 9, 11 per opening for items/bins 20 leaving the container structure 1 and one conveyor belt 8, 10 per opening for items or bins 20 entering the container structure 1. If the positions and direction of movement of the conveyor belts are the same for all openings of all containers in an assembly 100, the conveyor belts of the various containers can cooperate to pass items or bins 20 between them.

Whilst reference has been made to openings 30 in connection with FIG. 2 (and corresponding openings in FIG. 1), it will be appreciated that a container structure which does not have solid sides (such as for indoor use) may not have identifiable openings as such, since the entire side or end face may be "open", with just a frame remaining. In such "open container structure" embodiments, the term "opening" would preferably be understood to refer to an area in one of the main faces of the container structure through which items or bins 20 can pass, by means of the conveying means.

A further variant may not even have a frame structure around the main faces of the cuboid. For example, the entire contents of the container structures 1 and 1*a* shown in FIGS. 1 and 2 could simply rest on the floor 2 of the container structures, with the conveying means and perhaps also the racks 21 mounted to the floor 2. In this case, the convex hull of the container structure would not necessarily resemble a cuboid. In such a case, it is convenient to refer to the footprint of the container structure in order to define an "opening" or interface to an adjacent container structure. The footprint would normally be defined by the "generally rectangular" area defined by a vertical projection of the floor 2 of the container structure (assuming that the container structure is in an upright position). In such a "floor only" container structure, the conveyor belts 8 to 11 would not normally project beyond the footprint of the container structure, whilst items and bins 20 would of course project beyond this footprint as they are being conveyed from one container structure to an adjacent container structure.

Figure 4:
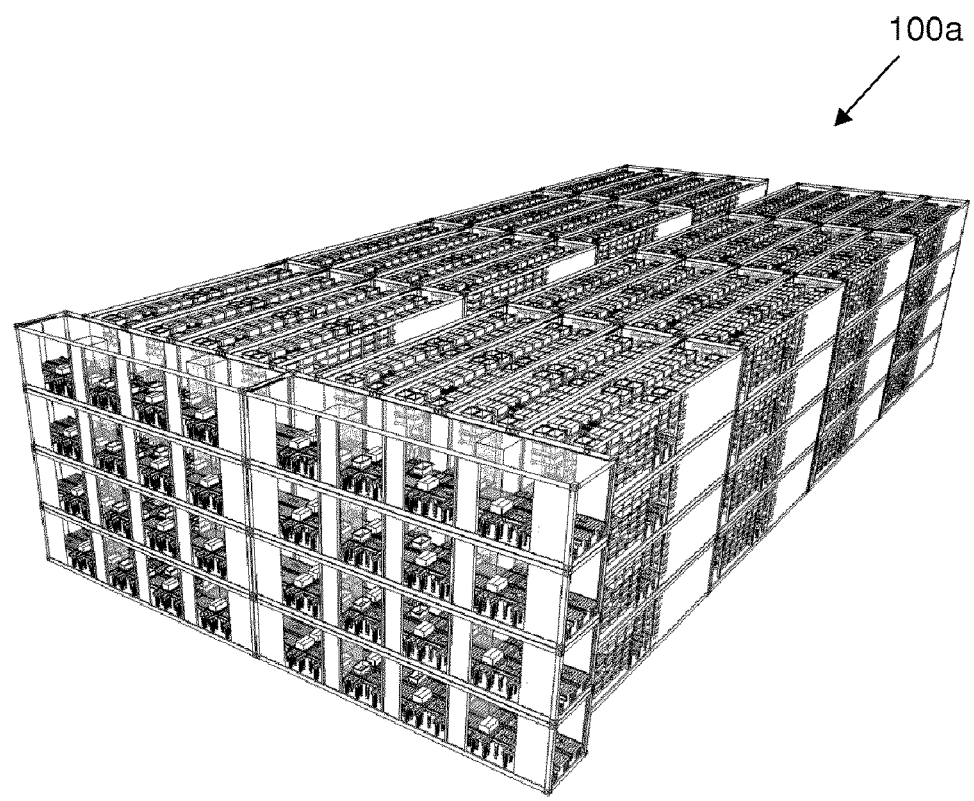
FIG. 4 shows an assembly of container structures according to an embodiment of the present invention.

FIG. 4 shows an alternative embodiment of an assembly 100*a*, in which container structures 1 and 1*a* are not only located horizontally adjacent each other, but also stacked vertically. Such an assembly 100*a* could, of course, only be made with container structures which either have solid sides or at least a frame structure around the main faces of the container structure (except that the top level in each stack could have a "floor only" container structure).

At least some of the container structures shown in the assembly 100*a* of FIG. 4 are provided with conveying means for conveying items or bins 20 from one container structure to a vertically adjacent container structure. This will be described later.

Figure 5:
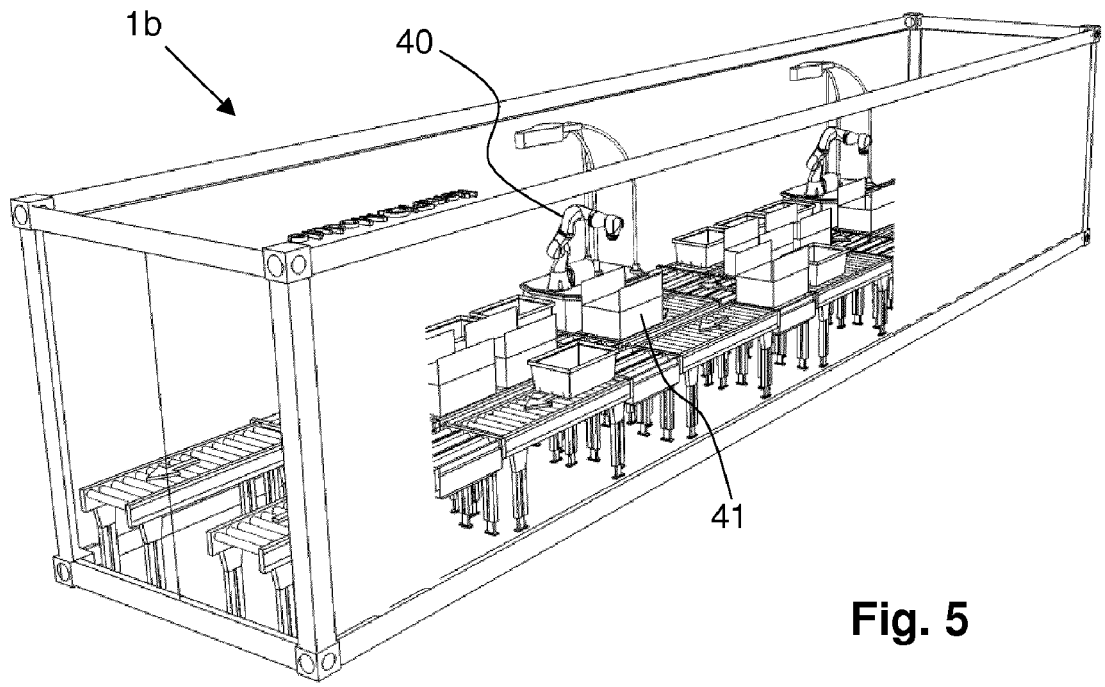
FIG. 5 shows a perspective view of a container structure according to a further embodiment of the present invention.

FIG. 5 shows a further embodiment of a container structure 1*b*. This is again provided with conveyor belts at at least some of the locations corresponding to those of the container structures 1 and 1*a*. However, the container structure 1*b* has a packing station, where a robot 40 can pack items into cartons 41. The items may be conveyed within bins 20, picked up by robot 40 and placed in carton 41 ready for dispatch. Alternatively, the items may be conveyed directly on a conveyor belt (i.e. not within a bin 20) and also picked up by robot 40 and placed in carton 41.

Container structures with different functionality can also be provided within the overall system, such as container structures housing a carton handling module (automated carton erecting and/or closing machine) and container structures with a loading bay (for loading packages into a van) or customer pick-up points. Whilst these are not shown, it is envisaged that they also have conveyor belts in appropriate locations so that they can cooperate with the container structures 1, 1*a* and 1 *b* within an assembly 100 or 100*a*.

The overall operation of an assembly 100 or 100*a* may be controlled by an overall control unit (not shown) built into one of the container structures or provided as a separate unit, even off site, with any necessary wired or wireless connections to the assembly 100, 100*a*. The overall control unit may provide suitable instructions to the individual container structures, each of which can control their own conveyor belts, robotic installations, etc.

The inventor has appreciated that the modular nature of assemblies according to the present invention offer new possibilities when it comes to replenishing container structures whose primary purpose is to store items (such as container structure 1 of FIG. 1). In an assembly with at least two container structures, the assembly can be controlled such that all items originally stored in one of the container structures can be redistributed (i.e. conveyed) to one or more other container structures in the assembly. Assuming there is enough storage space in the one or more other container structures, all items can thus be removed from the first container structure so that its racks either become empty or are populated only with empty bins 20. Once in this state, the first container structure can be removed from the assembly (by crane, forklift or similar) and removed off-site by lorry or some other mode of transport. A full container can then be added to the assembly, either in the same position where the empty container structure was, or a different location within the assembly. Of course, because of the modularity, the new container structure can be added to the assembly before the empty container structure is removed from the assembly. As a variant to the above described replenishment process, container structures may be removed or exchanged for a different one not only when all items have been removed from that container structure. For example, all items of a first type could be removed from the first container structure and items of a second type could be conveyed into the storage locations of the first container structure. The second type of items could for example comprise faulty or returned goods, unnecessary packaging, items intended for a different assembly of container structures at a different site, etc.

In accordance with embodiments of the present disclosure, the overall controller of the assembly is programmed such that it causes the removal of items from a container on the outside of the assembly so that this container can easily be removed. Nevertheless, the modular nature of assemblies according to embodiments of the disclosure also permit the removal of containers which are not on the outside of the assembly, although in this case other containers may first need to be removed (and added at a different location within the assembly or temporarily stored elsewhere) in order to provide access to the container structure which originally was not located on the outside of the assembly.

Figure 6:
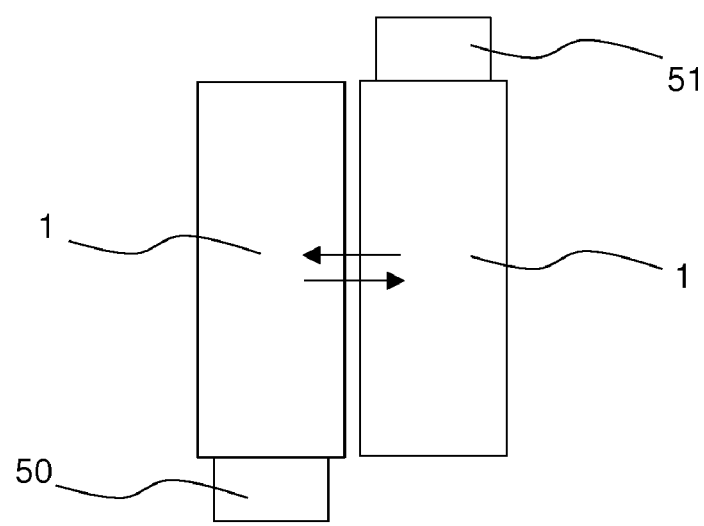
FIG. 6 shows an assembly of two container structures according to an embodiment of the present invention.

FIG. 6 illustrates a further embodiment of the present disclosure. FIG. 6 is a strongly simplified representation of two lorries 50 and 51, each carrying a container structure 1. The lorries 50 and 51 are parked sufficiently close to each other so that the two container structures 1 are located sufficiently close to each other so that items and/or bins 20 can be conveyed from one of the container structures to the other container structure and, if desired, vice versa. This exchange of items is indicated in FIG. 6 by the two arrows.

Once the lorries 50, 51 are parked in a suitable location, doors (e.g. sliding doors) could be opened on the side of each container structure facing the other container structure (for example the location indicated by the two arrows) so as to enable items and/or bins 20 to be exchanged. In order to facilitate the exchange of items and/or bins 20, a conveyor belt or other conveying means in one or both of the container structures 1 could be telescopically extended towards, or even into, the other container structure 1. A robot or human worker could then place items/bins onto, or take them from, the respective conveyor belts. A possible implementation of suitable doors, their operation and the extending of a conveyor belt from one container structure towards, or into, another container structure is illustrated with reference to FIGS. 8a-8d below.

The exchange of items illustrated in FIG. 6 could for instance take place at a car park, motorway service station, or any other site where at least two lorries can park close to each other. In particular, the exchange of items can take place while the container structures are located on the respective lorries, i.e. does not need to take place at or near a warehouse, does not require a forklift truck, crane or similar to move the container structures, and does not require any additional vehicles or similar to convey items from one container structure into the other since each container structure is equipped with their own conveying means.

The lorries 50, 51 need not necessarily park as indicated in FIG. 6. They can, for example, face in the same direction, can park end-to-end or end-to-side. Additionally, more than two lorries can meet to exchange items, for example all next to each other either facing in opposite directions (as shown in FIG. 6) or facing in the same direction.

As a variant, one of the container structures may be of the type shown in FIG. 2, so that several (e.g. nine) container structures of e.g. the type shown in FIG. 1 can connect to the "central" container structure shown in FIG. 2. The use of a central container structure 1a from FIG. 2 may accelerate the exchange of items when compared with an exchange of items with several container structures 1 from FIG. 1 without a container structure 1a.

The exchange of items described with reference to FIG. 6 can make the distribution of goods from more than one warehouse or manufacturing site to more than one location more efficient since each container structure involved in the exchange of items can leave a warehouse or manufacturing site carrying e.g. just one type of item. Items are then exchanged while the container structures are still on their respective lorries. After the exchange of items the lorries can continue their journeys with their respective container structures, now carrying mixed loads, to different locations.

As a further variant, the exchange of items could instead involve two or more container structures carried on railway rolling stock, ships or other means of transport. Further, the exchange of items could involve different means of transport (e.g. lorry parked next to railway rolling stock).

FIGS. 7a and 7b illustrate a further embodiment, which can be used in connection with any of the container structures described herein. FIG. 7a shows an outline of a container structure 1c, where most details have been omitted. FIG. 7a shows a conveyor belt 13, on which an item 22 is being conveyed. Also shown is a lift 14 comprising a static portion 17 mounted to a vertical beam 16 of container structure 1c. A movable portion 18 is supported by the static portion 17 such that the movable portion 18 can move up and down in relation to the static portion 17. In FIG. 1c, the movable portion 18 is shown in its lowest position. Movable portion 18 in turn supports a platform 19 which, in the schematic illustration of FIG. 7a, has a generally L-shaped profile. The platform 19 can move up and down with respect to movable portion 18. FIG. 7a shows platform 19 in its lowest position in relation to movable portion 18. Further mechanisms (not shown) can be provided to facilitate the movement of item 22 from conveyor belt 13 onto platform 19 and vice versa.

FIG. 7b shows two container structures, wherein a container structure 1d is located on top of container structure 1c from FIG. 7a. Container structure 1d—which can be essentially identical to container structure 1c—also has a conveyor belt 13a and a lift 14a, with a static portion 17a fixed with respect to a vertical beam 16a of container structure 1d. Lift 14a further comprises a vertically movable portion 18a and a platform 19a. Not illustrated is an opening in the top of container structure 1c and a corresponding opening in the bottom of container structure 1d. The openings can, for example, be covered with a sliding door, which is opened when container structure 1d is placed on top of container structure 1c so as to provide vertical access between container structure 1c and container structure 1d.

FIG. 7a illustrates a moment when item 22 is being transferred from conveyor belt 13 onto platform 19. Once item 22 is located on platform 19, the lift 14 moves upwards. That is, movable portion 18 moves upwards with respect to static portion 17, and platform 19 moves upwards in relation to movable portion 18. FIG. 7b illustrates lift 14 in the position after this movement. Movable portion 18 and platform 19 extend through the openings (whose doors, if provided, have been opened) so as to reach into container structure 1d to a level where platform 19 is at a level where it can transfer item 22 onto conveyor belt 13a of container structure 1d. Once this transfer has been completed, lift 14 can descend/retract into container structure 1c and while it does so it may optionally transfer an item from container structure 1*d* into container structure 1*c*.

In the embodiment shown in FIGS. 7*a* and 7*b*, container structures 1*c* and 1*d* have their lifts 14 and 14*a* in the same place. Lift 14*a* of container structure 1*d* is raised somewhat (movable portion 18*a* is raised by a relatively small amount and platform 19*a* is raised to its topmost position) so as to create space for lift 14 reaching into container structure 1*d* without interfering with lift 14*a*.

Whilst not shown, one or more lifts may also be provided in any of the container structures for extending/reaching into a container structure below. Further, the lifts 14, 14*a* are not limited to the type shown in FIGS. 7*a* and 7*b*. Various other types of lifts can be used instead or in combination, for example a telescopic lift, a scissor lift, or a rack lift. Suitable lifts and their principles of operation will be known to those skilled in the art. Additionally, or instead, a robotic arm may be provided to convey items from one container structure into a vertically adjacent container structure.

Whilst lift 14 is shown in FIG. 7*b* as extending beyond the convex hull of container structure 1*c*, and indeed into the convex hull of container structure 1*d*, it would alternatively be possible for lift 14 to remain within the convex hull of container structure 1*c*, but at a topmost position within this constraint, in which case item 22 might project into a space outside the convex hull of container structure 1*c* and potentially into the convex hull of container structure 1*d*. The item 22 could then be picked up by a lift or similar mounted into or onto container structure 1*d*, which for this purpose may comprise a robotic arm.

FIGS. 8*a* to 8*d* illustrate a further embodiment, which again can be used in connection with any of the container structures of the present invention. In particular, FIGS. 8*a* to 8*d* illustrate openings in a container structure (of which only a portion is shown) which may be provided at one or more of the main faces of the container structure.

Figure 8A:
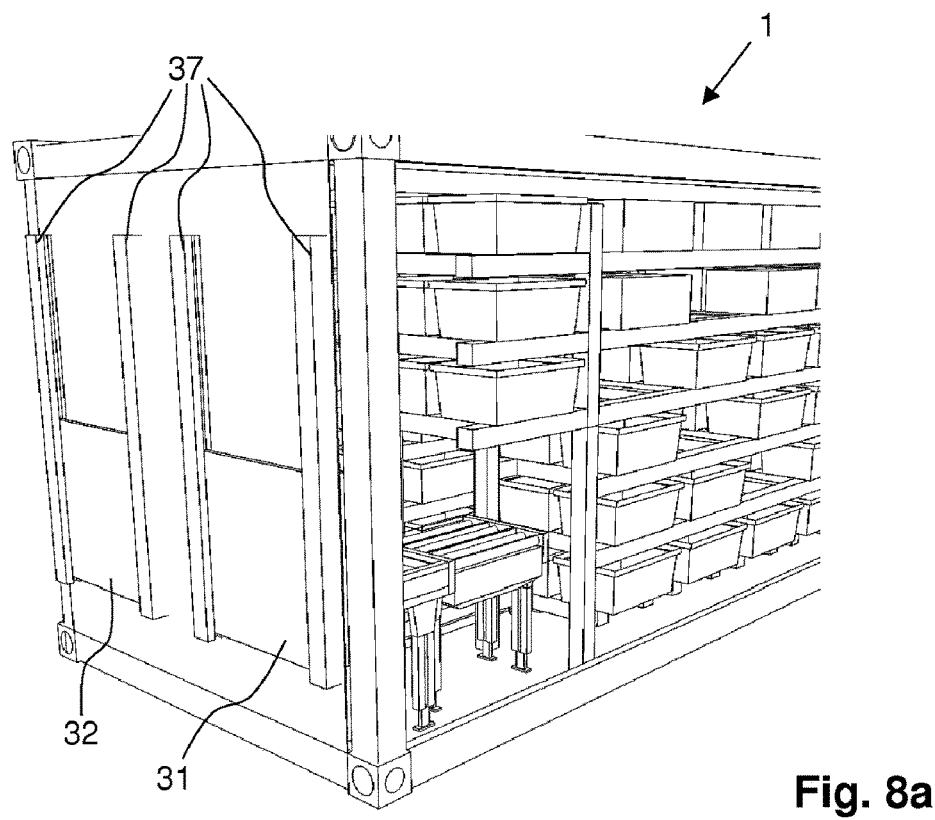
FIGS. 8a-d shows a portion of a container structure according to an embodiment of the present invention.

FIG. 8*a* shows a portion of a container structure. In this example, this is the container structure 1 of FIG. 1. At its end face, the container structure 1 has two sliding doors 31 and 32, which are guided by rails 37 mounted on the end face of container structure 1. Doors 31 and 32 can slide up along rails 37. FIG. 8*a* shows the doors in a closed condition, covering openings (not visible in FIG. 8*a*).

Figure 8B:
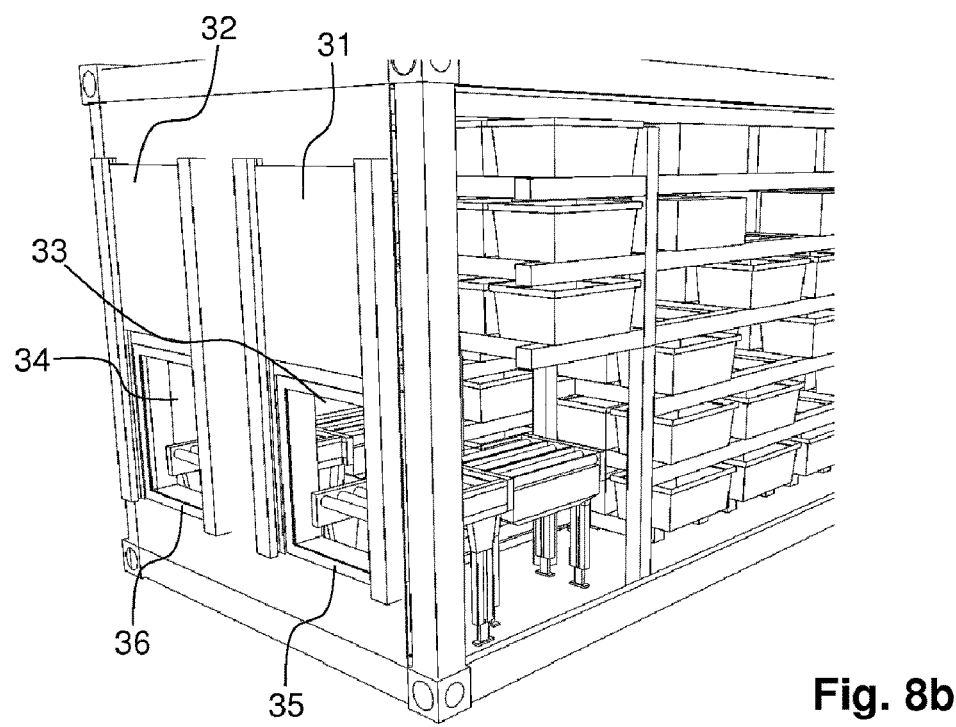

FIG. 8*b* shows the container structure 1 of FIG. 8*a* with the doors 31 and 32 in the open condition. The doors 31 and 32 have been opened by moving them up along rails 37 so as to reveal two openings 33 and 34, respectively. The openings 33 and 34 are placed and dimensioned such that they are generally aligned with conveyor belts inside container structure 1, and such that items, bins, cartons, etc. can pass through the openings 33, 34 when conveyed by the conveyor belts from the inside of the container structure 1 towards the outside of container structure 1, e.g. into an adjacent container structure.

Optionally, the openings 33, 34 are provided with seals 35, 36, respectively. Such seals can be useful if the container structure 1 is intended for outside use. The seals could be omitted if the container structure is intended for indoor use or if exposure to the elements (rain, wind, etc.) does not matter.

Figure 8C:
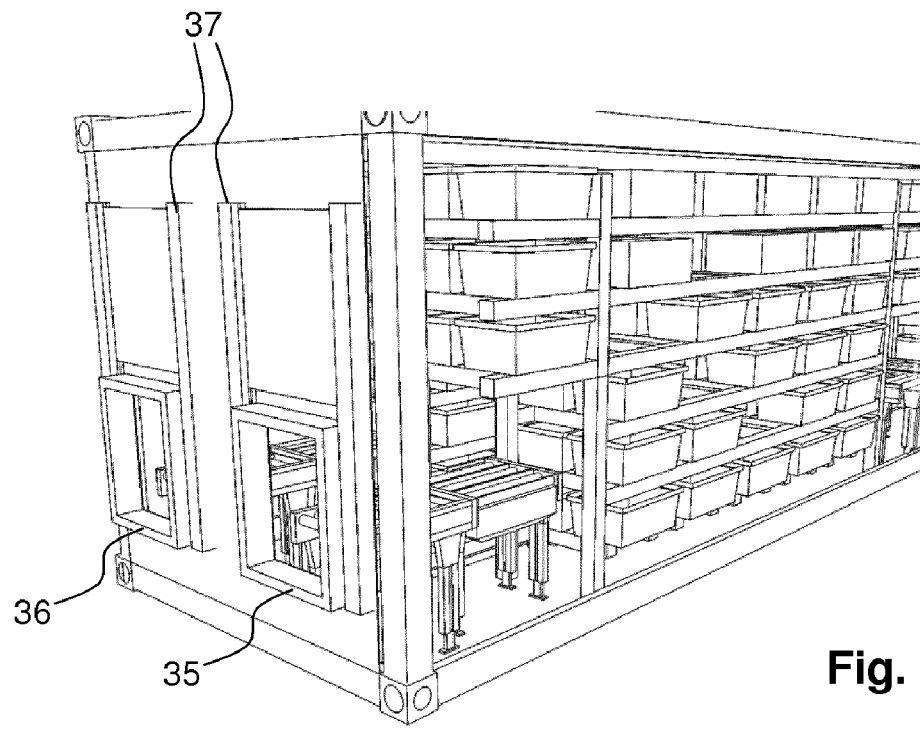
Figure 8D:
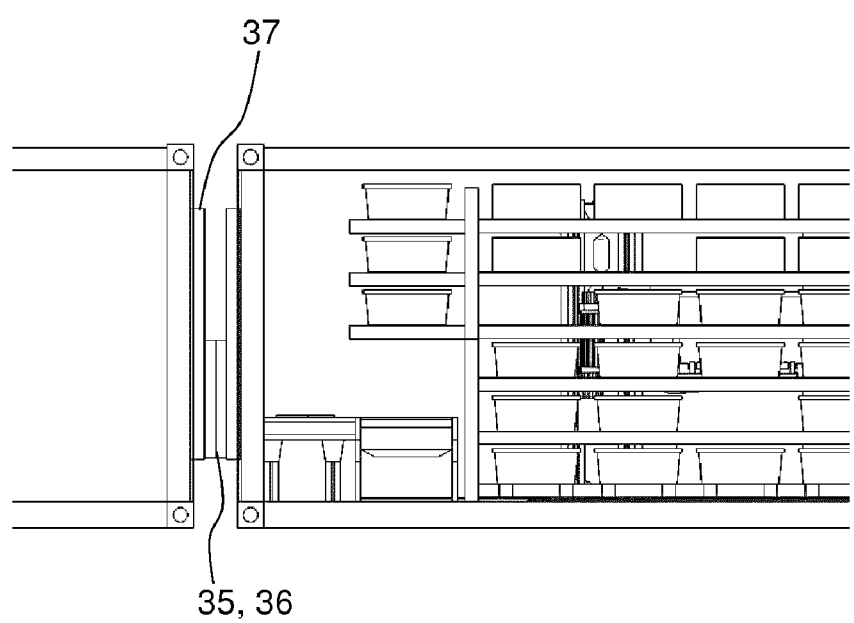

According to some embodiments, the seals 35, 36 are configured such that, when the doors 31, 32 are closed, the seals are located behind the doors. However, the seal of one container structure can be brought into contact with a corresponding seal of an adjacent container structure when the container structures are placed near each other. The seals can, for example, be retractable/extendable, as shown in FIG. 8*b* to 8*d*. FIG. 8*b* shows the seals 35, 36 in a retracted condition. FIG. 8*c* shows the container structure 1 of FIG. 8*b* with the doors 31, 32 in the open condition and with the seals 35, 36 in an extended position. To this end, the seals 35, 36 have been moved outwardly so that they project beyond the rails 37. As shown in the example of FIG. 8*c*, the seals 35, 36 have been moved as a whole. Alternative seal constructions are possible, such as, without limitation, inflatable seals, stretchable seals (where only the outer portion is moved outwardly), a bellows-type seal or foldable seals (where one or more portions of the seal are pivoted about an axis parallel to the respective main face of the container structure).

Various implementations (not illustrated in detail) of extendable seals are possible. The seal could be made from a sufficiently flexible/stretchable material, such as rubber or similar, in order to provide a sealing function.

As a first example of a seal which is movable as a whole, a reinforcing material such as a metal frame could be integrated (e.g. moulded) into the sealing material. The reinforcing material could be connected to an actuator located within the container structure 1, which actuator could move the reinforcing material and hence the entire seal outwardly (i.e. towards the other container structure 1) and also retract it.

A second example of a seal could be constructed similar to the first example, except that the reinforcing material might only be provided towards the outside of the seal (the side of the seal facing the other container structure). The inner side of the seal (i.e. towards the container structure to which the seal belongs) could be fixed to that container structure. When the reinforcing material/frame is moved outwardly by the actuator the seal would stretch (or in the case of a concertina type seal the concertina would unfold). When the actuator movement is reversed the seal would return to its initial state.

If the seal is implemented as an inflatable seal, the seal could take the form of an inflatable chamber of flexible/stretchable material, which is fixed to the container structure 1 but such that it can expand towards the other container structure when being inflated. A hose or pipe connected to a pump (built into the container structure 1) could extend into the chamber in order to inflate and deflate the seal. Such an inflatable seal could be provided as one chamber extending part-way, or entirely, around the opening 33, 34, or as several chambers which together extend part-way, or entirely, around the opening.

FIG. 8*d* shows a side view of a portion of two adjacent container structures. Seals 35, 36 of each container structure have been extended/inflated so that they project outwardly beyond rails 37 and so that they meet at a common interface, thereby substantially sealing the openings 33, 34.

Whilst seals 35, 36 have been shown as rectangular frames closed on all four sides, it would be possible, according to variants, to provide a seal e.g. only on three sides of the opening (top, left and right) or seals of a different shape (curved, oval, etc.).

Further, whilst sliding doors such as doors 31, 32 are preferred since they move substantially only parallel to the main face of the container structure in which they are located, other door constructions, including pivotable doors or concertina doors, are also possible.

In variants, the doors could also slide in a lateral direction or downwards in order to open the openings 33, 34.

Further, whilst FIGS. 8*a* to 8*d* show two separate openings 33, 34 with two separate doors 31, 32, it would alternatively be possible to provide e.g. a single door covering both openings, or a single opening with a single door for both conveyor belts.

As will be appreciated from FIG. 8d in particular, two adjacent container structures may need to be placed relatively close to each other so that the seals 35, 36 can bridge the gap between the container structures and so that conveyor belts or similar located within the container structures can transfer items or bins 20 from one container structure to an adjacent container structure. The maximum distance between two adjacent container structures may also depend on the size of the items/bins. It is envisaged that two container structures should have a maximum distance of 60 cm, e.g. measured as the distance between their convex hulls (with seals retracted/deflated) or as the distance between rails 37. According to some embodiments, the distance may need to be less than 50 cm, less than 40 cm, less than 30 cm, less than 20 cm, or less than 10 cm.

In some embodiments (not illustrated), the conveyor belts (or other conveying means) can be made to extend beyond the footprint or convex hull of the container structure (e.g. as determined while any seals associated with the openings are in a retracted/deflated condition). In the case of a robotic arm, for example, the robotic arm could be mounted and dimensioned such that it can reach through an opening in the container structure in which it is mounted, and potentially into an opening of an adjacent container structure. In the case of a conveyor belt, the conveyor belt could be movable as a whole (e.g. in a pivoting or translational movement) so as to extend outwardly. Alternatively, only part of the conveyor belt could be moved outwardly, in which case the conveyor belt might be stretched or the spacing between rollers of the conveyor belt might be increased.

The robotic arm, conveyor belt, or other conveying means may be provided with a smaller degree of extendibility. For example, their reach may remain set back from the inside of the doors 31, 32 during transport of the container structure 1 (or while the doors 31, 32 are closed), whereas their reach can be extended somewhat so that a safe handover of items or bins 20 to an adjacent container is possible, even if their reach is not extended all the way up to, or beyond, the common interface between the seals 35, 36 of adjacent containers (see FIG. 8d), or a mid-plane between two adjacent containers.

As will be appreciated in particular from FIGS. 8b to 8d, if a flat surface (not shown), in particular one that is larger than the end face of container structure 1, was pressed against the end face shown in FIG. 8b and kept parallel to that end face, the seals 35, 36 would, in their retracted/deflated position, not touch that flat surface. However, when the seals are in an extended/inflated condition (FIG. 8d), they would touch the flat surface pressed against the end face of container structure 1.

Whilst the door construction with seals as described with reference to FIGS. 8a to 8d is particularly useful in the context of the container structures described in the present application, it will be appreciated that it could be used in connection with other containers/container structures, in particular intermodal freight containers which do not necessarily comprise conveying means integrated or mounted into or onto the container or container structure.

Figure 9A:
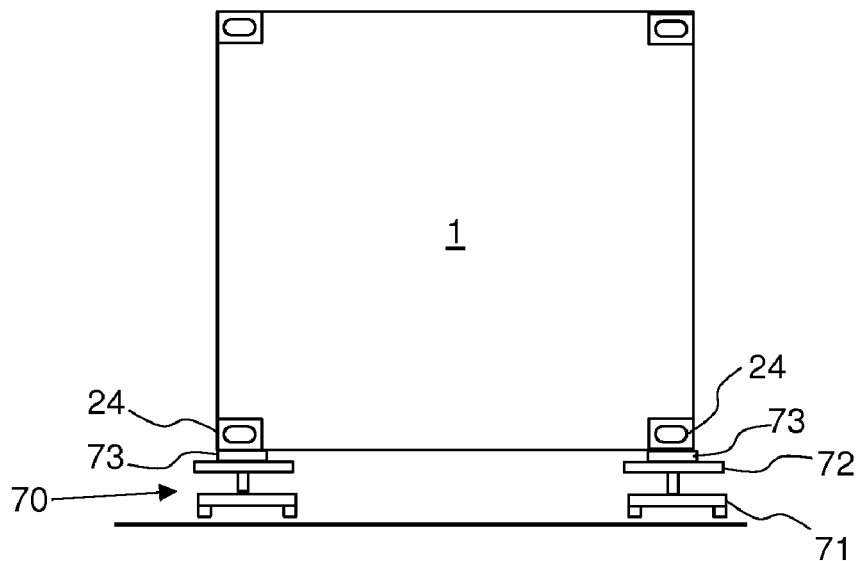
FIGS. 9a-b show an end view of a container structure with adjustment mechanisms according to an embodiment of the present invention.

FIG. 9a illustrates a further embodiment, which can be used in connection with any of the container structures referred to in the present application. However, the embodiment of FIG. 9a also finds use in connection with other container structures or containers, in particular standard intermodal freight containers, i.e. also those without conveying means integrated or mounted into or onto the container structure and containers without the openings/doors described with reference to FIGS. 8a to 8d.

FIG. 9a shows a container structure 1 as seen from one longitudinal end. The bottom corners 24 can, in principle, be of a standard construction, such as is the case for intermodal freight containers. However, a translation mechanism or adjustment mechanism/device 70 is located/mounted under the corners 24. The translation mechanism comprises a base portion 71 and a movable portion 72. The movable portion 72 contacts the container structure 1 either directly or via an intermediate portion 73. The intermediate portion 73 would be shaped so as to cooperate with the corners 24 of container structure 1 so as to attach the translation mechanism to the container structure 1. In embodiments where no intermediate portion 73 is used, the movable portion 72 could be shaped in an appropriate way so as to engage corners 24.

The base portion 71 and movable portion 72 are connected in such a way that movable portion 72 can be translationally moved in a horizontal direction with respect to base portion 71. One skilled in the art will be aware of suitable mechanisms, in particular motorized ones, for this purpose so that details of such mechanisms are not provided herein.

Figure 9B:
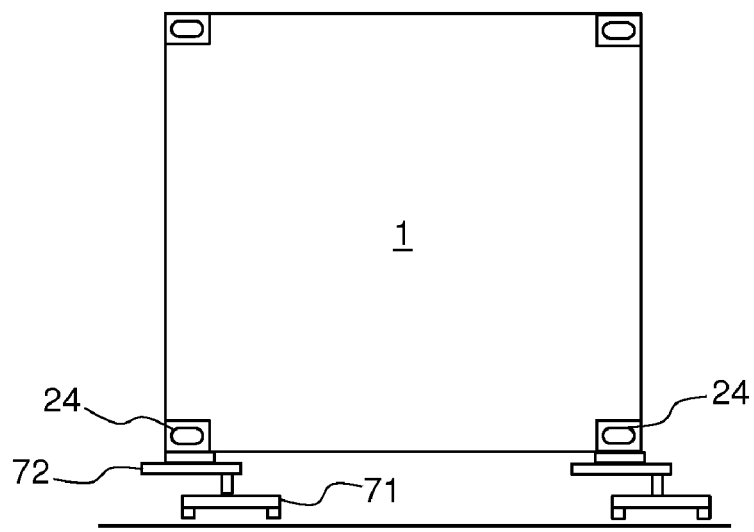

FIG. 9b shows the container structure 1 and translation mechanism 70 of FIG. 9a after the movable portion 72 has been moved horizontally with respect to base portion 71. It will be apparent from a comparison of FIGS. 9a and 9b that the translation mechanism 70 enables container structure 1 to be translated horizontally. Depending on the particular implementation of translation mechanism 70, it may be possible to move container structure 1 horizontally only in one dimension (left/right; or along the longitudinal axis of container structure 1) or in two dimensions.

In any event, the translation mechanism 70 enables container structure 1 to be moved horizontally with respect to the ground or any other structure on which base portion 71 may rest. Advantageously, this may be used in positioning container structures in order to form an assembly 100 or 100a. A lorry, crane or forklift truck may not be able to position a container structure 1 sufficiently close to a desired position (in particular adjacent another container structure 1) to enable items or bins 20 to be transferred from one container structure to the adjacent container structure. The translation mechanism 70 enables horizontal adjustments to be made, for example in a range of a few centimeters, for example up to 10 or 20 cm.

In some embodiments, the translation mechanism 70 may be integrated, or substantially permanently mounted, onto the container structure 1, for example by welding or through the use of bolts. The translation mechanism 70 would then normally remain attached to the container structure, even during transport.

In alternative embodiments, the translation mechanism 70 would be detachable from the container structure, preferably without the use of tools such as a spanner. The attachment and detachment of the translation mechanism 70 to/from the container structure could be carried out in the same way as intermodal freight containers are connected to each other.

In the embodiment of FIGS. 9a and 9b, the translation mechanism 70 projects laterally beyond the corners of the container structure 1. Further, the base portion 71 is not necessarily shaped such that it conforms to, or can cooperate with, a corner 24 of e.g. an intermodal freight container. In an alternative embodiment (not shown), the base portion 71, and in particular its bottom surface, is shaped and/or dimensioned similar to a corner 24 of container structure 1, e.g. an intermodal freight container. In this way, a container structure 1 including one or more translation mechanisms 70 attached to its corners 24 can be placed on another container structure and connected thereto, as is the case with intermodal freight containers in use today. Further, the translation mechanism could be set back into the body of container structure 1 so that the overall height of container structure 1 including attached translation mechanism 70 matches that of a state-of-the-art intermodal freight container.

The translation mechanism 70 can be provided as a standalone product, not necessarily attached to a container structure 1 or intermodal freight container.

Whilst the operation of an assembly 100, 100a or of an individual container structure described herein allows for a high degree of automation or even substantially full automation without much or any human intervention, it is nevertheless possible according to some embodiments of the invention for humans to interact with the container structure(s), its components or an entire assembly of container structures. To this end, container structures in accordance with some embodiments allow humans to have access to the interior of the container structure (or to the footprint or convex hull), and can have openings, doors and/or hatches other than the openings described with reference to FIGS. 2 and 8a to 8d. Further, according to some embodiments, lighting is provided in or at any of the container structures.

It will also be appreciated that, whilst most embodiments which have been described allow items or bins to be conveyed from one container structure to an adjacent container structure, the invention nevertheless finds applicability in connection with container structures which do have a conveying means integrated or mounted onto or into the container structure but which only convey items or bins within that container structure and not beyond the footprint or convex hull of that container structure. Such a container structure may, for example, be used as a small-scale individual warehouse (preferably with access for humans so that they can add/remove items/bins to/from the container structure) which can be easily put in a certain location and removed therefrom, thus offering a more flexible approach than traditional warehouses, which tend to be permanent structures.

At least some embodiments in accordance with the present disclosure can provide the following advantages:
1. A more flexible approach as distribution centers or similar can be reconfigured more easily than traditional distribution systems with state-of-the-art containers and warehouses.
2. Smaller distribution centers (comprising only one container structure or a small number of container structures), whereas a state of the art distribution center on such a small scale (not least bearing in mind staff costs) might not be economical. This in turn might enable a larger number of such relatively small distribution centers to be maintained, thereby potentially reducing the distance to customers/end users.
3. Ease of putting a container structure on site and adding a container structure to a site and connecting with other container structures. Likewise disconnecting a container structure from another container structure and removing a container structure from a site, or reconfiguring containers at a site.
4. Potentially better balancing supply and demand and faster handling of goods.

Although the invention has been described in terms of various embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

LIST OF REFERENCE SIGNS 1, 1a, 1b, 1c, 1d container or container structure
2 bottom/floor
3 top/ceiling
4, 5 side
6, 7 end face
8 to 11 conveying means/conveyor belts
12 conveying means/robotic installation
13, 13a conveying means/conveyor belt
14, 14a lift
16, 16a vertical beam
17, 17a fixed portion
18, 18a movable portion
19, 19a platform
20 bin
21 rack/shelf
22 item
23 frame structure
24 corner/connector
25 opening
31, 32 (sliding) door
33, 34 opening
35, 36 seal
37 rail
40 robot/robotic arm
41 carton
50, 51 lorry
70 translation/adjustment mechanism/device
71 base portion
72 movable portion
73 intermediate portion
100, 100a assembly (of container structures)

What is claimed is:
1. An assembly comprising,
a first shipping container comprising a first container structure; and
a second shipping container located on top of the first shipping container and comprising a second container structure;
the first container structure having a top main face, and a first opening in the top main face; and
the first container structure further comprising first conveying means integrated or mounted into or onto the first container structure, the first conveying means configured to convey items within a footprint or a convex hull of the first container structure;
the second container structure comprising second conveying means integrated or mounted into or onto the second container structure, the second conveying means configured to convey items within a footprint or a convex hull of the second container structure;
the first or second conveying means comprising at least one of a conveyor belt, a robotic arm, or a lift, and further configured to convey items from the first con- tainer structure through the first opening in the top main face of the first container structure and into the second shipping container.

2. The assembly of claim 1, wherein one of:
the respective conveying means is further configured to convey items beyond the footprint or convex hull of the container structure; or
the respective conveying means is configured to extend beyond the footprint or convex hull of the container structure.

3. The assembly of claim 2, wherein:
the respective conveying means comprises a conveyor belt; and
at least a portion of the conveyor belt is configured to move from a position within the footprint or convex hull of the container structure to a position outside the footprint or convex hull of the container structure.

4. The assembly of claim 3, wherein the conveyor belt is configured to move as a whole so that at least the portion of the conveyor belt moves from the position within the footprint or convex hull of the container structure to the position outside the footprint or convex hull of the container structure.

5. The assembly of claim 3, wherein the conveyor belt is configured to perform a sliding or pivoting movement so that at least the portion of the conveyor belt moves from the position within the footprint or convex hull of the container structure to the position outside the footprint or convex hull of the container structure.

6. The assembly of claim 2, wherein the conveying means comprises one of:
a robotic arm configured to reach beyond the footprint or convex hull of the container structure; or
a lift configured as one of a telescopic lift, a scissor lift, or a rack lift.

7. The assembly of claim 2, wherein the respective conveying means is configured to remain within the footprint or convex hull of the container structure and to convey items to a position where they project into a space outside the footprint or convex hull of the container structure.

8. The assembly of claim 2, further comprising at least one opening in at least one wall of the container structure, the at least one opening configured to facilitate conveying items therethrough.

9. The assembly of claim 8, further comprising at least one door associated with the at least one opening, the at least one door operable between a closed condition covering the at least one opening, and an open condition whereby items may be conveyed through the at least one opening.

10. The shipping container of claim 1, wherein the container structure has a footprint and/or overall dimensions substantially corresponding to those of an intermodal freight shipping container.

11. The assembly of claim 1, wherein the first container further comprises a door associated with the opening in the top main face, wherein the door is operable between a closed condition covering the opening in the top main face, and an open condition whereby items may be conveyed through the at least one opening.

12. An assembly comprising:
a first shipping container; and
a second shipping container;
wherein the first shipping container comprises:
a container structure having a top main face, and a first opening in the top main face, and
conveying means integrated or mounted into or onto the container structure;
wherein the conveying means is configured to convey items within a footprint or a convex hull of the container structure;
wherein the conveying means is further configured to convey items through the first opening in the top main face;
wherein the first shipping container and second shipping container are located sufficiently close to each other such that the conveying means of the first shipping container or a further conveying means of the second shipping container is configured to convey items from the first shipping container or the second shipping container to the other of the first shipping container or the second shipping container; and
wherein the respective conveying means comprises at least one of a conveyor belt, a robotic arm, or a lift.

13. The assembly of claim 12, wherein the conveying means of the first shipping container or the further conveying means of the second shipping container is configured to extend, respectively, into the footprint or convex hull of the other of the first or second shipping container.

14. The assembly of claim 12, further comprising:
a first transport means supporting the first shipping container; and
a second transport means substantially independently movable relative to the first transport means and supporting the second shipping container.

15. The assembly of claim 12, wherein:
the first shipping container and the second shipping container each comprise at least one separately identifiable storage location for storing a plurality of items; and
the assembly is configured to convey items from at least one storage location of at least one of the first shipping container or the second shipping container to at least one storage location of the other of the first shipping container or the second shipping container so as to reduce the number of, or to remove all of, the items stored in the at least one storage location of the first shipping container or second shipping container.

16. The assembly of claim 15, wherein at least one of:
the assembly is configured to convey items of a first type from the first shipping container to at least one storage location of the second shipping container so as to reduce the number of, or to remove all of, the items of the first type stored in the first shipping container; or
the assembly is configured to convey items of a second type from the second shipping container to the at least one first shipping container.

17. A method of operating the assembly of claim 15, the method comprising conveying items from the at least one storage location of one of the first or second shipping containers to at least one storage location of the other of the first or second shipping containers so as to reduce the number of, or to remove all of, the items stored in the at least one storage location of the first or second shipping containers.

18. The method of claim 17, further comprising at least one of:
removing one of the first or second shipping containers from the assembly; or
adding a further shipping container to the assembly.

19. A method for conveying items, the method comprising:
obtaining a first shipping container, the first shipping container having a first opening in a top main face thereof;

obtaining a second shipping container;

placing the second shipping container on top of the first shipping container;

conveying items within a footprint or a convex hull of the first shipping container using conveying means integrated or mounted into or onto the first shipping container; and conveying items through the first opening using the conveying means integrated or mounted into or onto the first shipping container;

wherein the conveying means comprises at least one of a conveyor belt, a robotic arm, or a lift.

20. The method of claim 19, further comprising:

conveying items beyond the footprint or convex hull of the first shipping container using the conveying means integrated or mounted into or onto the first shipping container.

21. A method of handling first and second container structures, the method comprising:

while the first container structure is located on a first means of transport and the second container structure is located on a second means of transport which is movable substantially independently from the first means of transport, positioning the first and second means of transport sufficiently close to each other so that the first and second container structures are located sufficiently close to each other such that items can be conveyed from one of the first or second container structures to the other of the first or second container structures; and while the first container structure is located on the first means of transport and the second container structure is located on the second means of transport, transferring items from the first container structure to the second container structure, and from the second container structure to the first container structure using conveying means integrated or mounted into or onto at least one of the first container structure or the second container structure.

* * * * *